(12) United States Patent
Ji

(10) Patent No.: US 7,350,205 B2
(45) Date of Patent: Mar. 25, 2008

(54) UPGRADING ELECTRONIC FILES OF A MOBILE DEVICE UPGRADE CLIENT

(75) Inventor: De Ji, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 635 days.

(21) Appl. No.: 10/965,948

(22) Filed: Oct. 14, 2004

(65) Prior Publication Data

US 2005/0204353 A1 Sep. 15, 2005

Related U.S. Application Data

(63) Continuation-in-part of application No. 10/292,245, filed on Nov. 12, 2002, now Pat. No. 6,836,657.

(60) Provisional application No. 60/511,048, filed on Oct. 14, 2003.

(51) Int. Cl.
  G06F 9/44 (2006.01)
  G06F 11/00 (2006.01)
(52) U.S. Cl. ...................... 717/172; 455/419
(58) Field of Classification Search ................ 717/169, 717/171–173; 714/747
  See application file for complete search history.

(56) References Cited

U.S. PATENT DOCUMENTS

| | | | |
|---|---|---|---|
| 4,875,159 A | 10/1989 | Cary |
| 5,444,764 A | 8/1995 | Galecki |
| 5,479,654 A | 12/1995 | Squibb |
| 5,574,906 A | 11/1996 | Morris |
| 5,634,052 A | 5/1997 | Morris |
| 5,729,735 A | 3/1998 | Meyering |
| 5,742,905 A | 4/1998 | Pepe |
| 5,758,062 A | 5/1998 | McMahon |
| 5,806,078 A | 9/1998 | Hug |
| 5,813,017 A | 9/1998 | Morris |
| 5,832,520 A | 11/1998 | Miller |
| 5,850,565 A | 12/1998 | Wightman |
| 5,864,757 A | 1/1999 | Parker |
| 5,893,119 A | 4/1999 | Squibb |
| 6,018,747 A | 1/2000 | Burns |
| 6,041,333 A | 3/2000 | Bretschneider |
| 6,052,531 A | 4/2000 | Waldin |
| 6,076,148 A | 6/2000 | Kedem |

(Continued)

OTHER PUBLICATIONS

Hauptmann, Steffen et al., "On-line maintenance with on-the-fly software replacement", Configurable Distributed Systems, Proceedings, Third IEEE International Conference, May 6, 1996, pp. 70-80.

(Continued)

*Primary Examiner*—Tuan Dam
*Assistant Examiner*—Eric B Kiss
(74) *Attorney, Agent, or Firm*—Courtney Staniford & Gregory LLP

(57) ABSTRACT

A portable communication device is provided that receives upgrade files via a wireless coupling. The contents of the upgrade file include information to repair errors in software components of the portable communication device and/or information to upgrade functions of the portable communication device. An upgrade client of the portable communication device automatically upgrades the software components using the upgrade file contents. Automatic upgrades of the software components include self-upgrades to software components of the upgrade client.

38 Claims, 7 Drawing Sheets

U.S. PATENT DOCUMENTS

| | | |
|---|---|---|
| 6,078,967 A | 6/2000 | Fulghum |
| 6,088,694 A | 7/2000 | Burns |
| 6,128,629 A | 10/2000 | Bretschneider |
| 6,145,012 A | 11/2000 | Small |
| 6,163,811 A | 12/2000 | Porter |
| 6,167,258 A | 12/2000 | Schmidt |
| 6,216,175 B1 | 4/2001 | Sliger |
| 6,226,784 B1 | 5/2001 | Holmes |
| 6,233,589 B1 | 5/2001 | Balcha |
| 6,269,456 B1 | 7/2001 | Hodges |
| 6,308,061 B1* | 10/2001 | Criss et al. ............... 455/418 |
| 6,327,671 B1 | 12/2001 | Menon |
| 6,349,311 B1 | 2/2002 | Sobel |
| 6,374,250 B2 | 4/2002 | Ajtai |
| 6,401,239 B1 | 6/2002 | Miron |
| 6,411,227 B1 | 6/2002 | Fish |
| 6,442,660 B1 | 8/2002 | Henerlau |
| 6,457,175 B1 | 9/2002 | Lerche |
| 6,466,999 B1 | 10/2002 | Sliger |
| 6,470,329 B1 | 10/2002 | Livschitz |
| 6,526,574 B1 | 2/2003 | Jones |
| 6,535,894 B1 | 3/2003 | Schmidt |
| 6,542,906 B2 | 4/2003 | Korn |
| 6,594,822 B1 | 7/2003 | Schweitz |
| 6,615,404 B1 | 9/2003 | Garfunkel |
| 6,629,110 B2 | 9/2003 | Cane |
| 6,651,061 B2 | 11/2003 | Unchida |
| 6,651,190 B1 | 11/2003 | Worley |
| 6,662,163 B1 | 12/2003 | Albayrak |
| 6,671,703 B2 | 12/2003 | Thompson |
| 6,671,757 B1 | 12/2003 | Multer |
| 6,694,336 B1 | 2/2004 | Multer |
| 6,701,315 B1 | 3/2004 | Austin |
| 6,754,816 B1 | 6/2004 | Layton |
| 6,785,786 B1 | 8/2004 | Gold |
| 6,836,657 B2 | 12/2004 | Ji |
| 6,892,381 B2 | 5/2005 | Kim |
| 6,898,564 B1 | 5/2005 | Odhner |
| 6,912,591 B2 | 6/2005 | Lash |
| 6,925,467 B2 | 8/2005 | Gu |
| 6,954,765 B2 | 10/2005 | Spiegel |
| 2001/0029178 A1 | 10/2001 | Criss |
| 2001/0049263 A1 | 12/2001 | Zhang |
| 2002/0099726 A1 | 7/2002 | Crudele |
| 2002/0120697 A1 | 8/2002 | Generous |
| 2002/0129107 A1 | 9/2002 | Loughran |
| 2003/0110253 A1 | 6/2003 | Anuszczyk |
| 2003/0200207 A1 | 10/2003 | Dickinson |
| 2003/0212712 A1 | 11/2003 | Gu |
| 2003/0220944 A1 | 11/2003 | Schottland |
| 2004/0031027 A1 | 2/2004 | Hiltgen |
| 2004/0062130 A1 | 4/2004 | Chiang |
| 2004/0073582 A1 | 4/2004 | Spiegel |
| 2004/0092255 A1 | 5/2004 | Ji |
| 2004/0098361 A1 | 5/2004 | Peng |
| 2004/0098413 A1 | 5/2004 | Peng |
| 2004/0098420 A1 | 5/2004 | Peng |
| 2004/0098421 A1 | 5/2004 | Peng |
| 2004/0098427 A1 | 5/2004 | Peng |
| 2004/0111427 A1 | 6/2004 | Gu |
| 2004/0111484 A1 | 6/2004 | Young |
| 2004/0193643 A1 | 9/2004 | O'Brien |
| 2004/0220980 A1 | 11/2004 | Forster |
| 2004/0225996 A1 | 11/2004 | Venkatesan |
| 2004/0260923 A1 | 12/2004 | Nakai |
| 2005/0010576 A1 | 1/2005 | Ren |
| 2005/0010870 A1 | 1/2005 | Gu |
| 2005/0060163 A1 | 3/2005 | Barsness |
| 2005/0091288 A1 | 4/2005 | Ji |
| 2005/0102318 A1 | 5/2005 | Odhner |
| 2005/0234997 A1 | 10/2005 | Gu |

OTHER PUBLICATIONS

Chakravorty et al., "Architecture and implementation of a remote management framework for dynamically reconfigurable devices", Networks, 2002. ICON 2002. 10th IEEE International Conference, Aug. 27, 2002, pp. 375-380.

Lyu et al., "A procedure0based dynamic software update", Dependable Systems and Networks, 2001. Proceedings, The International Conference, Jul 1, 2001. pp. 271-280.

Bialek, R. P., "The architecture of a dynamically updatable, component-based system", Computer Software and Application Conference, 2002. COMPSAC 2002. Proceedings, 26th Annual International, Sugust 26, 2002, pp. 1012-1016.

Gumbold, M., "Software distribution by reliable multicast", Local Computer Networks, 1996. Proceedings, 21th IEEE Conference, Oct. 13, 1996, pp. 222-231.

Tichy, Walter F., "The string-to-string correction problem with block moves", ACM Transaction on Computer Systems, vol. 2, No. 4, Nov. 1984, pp. 309-321.

* cited by examiner

UPGRADING ELECTRONIC FILES OF A MOBILE DEVICE UPGRADE CLIENT

RELATED APPLICATIONS

This application claims the benefit of U.S. patent application Ser. No. 60/511,048, filed Oct. 14, 2003. This application is also a continuation-in-part application of U.S. patent application Ser. No. 10/292,245, filed Nov. 12, 2002, now U.S. Pat. No. 6,836,657, both of which are currently pending.

This application is related to U.S. patent application Ser. No. 10/146,545, filed May 13, 2002, application Ser. No. 10/261,153, filed Sep. 30, 2002, application Ser. No. 10/298,458, filed Nov. 18, 2002, application Ser. No. 10/298,393, filed Nov. 18, 2002, application Ser. No. 10/616,615, filed Jul. 9, 2003, all of which are currently pending.

TECHNICAL FIELD

The disclosed embodiments relate to updating and maintaining electronic files.

BACKGROUND

Software is hosted or running on most electronic devices and includes one or more files in the form of human-readable American Standard Code for Information Interchange ("ASCII") plain text files or binary code. The hosted software, which runs on a processor or central processing unit ("CPU"), provides functionality in a host device but often changes over time. The software changes may result from the need to correct bugs, or errors, in the software files, adapt to evolving technologies, or add new features and functions. In particular, embedded software components hosted on mobile wireless devices often include numerous software bugs that require correction.

The software of a device includes software files divided into smaller units that are often referred to as modules or components. In mobile wireless devices, a real-time operating system ("RTOS") is typically used in which the hosted software modules or components of the device are linked as a single large file. This large software file is loaded, or embedded, into the device, and is typically stored in the read-only-memory ("ROM") or flash ROM of the wireless device.

The hosted software files of a wireless device can be updated to correct errors or add new functions using a wireless communication link or over-the-air ("OTA") link like a radio link. Because of bandwidth, memory and other constraints relating to the wireless device, updating the hosted software after the device has been commercially released requires special proprietary applications. An example of these proprietary applications includes the upgrade or update applications referred to as DeltaUpdate™ and DeltaRewrite™ available from InnoPath Software, Inc. of Aliviso, Calif. These upgrade applications are also the subject of the Related Applications.

While the upgrade applications are designed to modify the software hosted on the device, the upgrade applications cannot be used to update themselves. Typical upgrade applications cannot self-upgrade because they control the upgrade process of the device and are required to be running in order for execution of the upgrade process. The typical upgrade methods however require that software not be running in order for it to be upgraded. As such, upgrades of the upgrade applications themselves require the device to be returned to the device manufacturer or service provider for upgrade. Returning the devices to the manufacturer or service provider is a time-consuming and costly process not highly regarded by consumers because of the consumer's increased reliance on these devices. Consequently, there is a need to provide self-upgrades of upgrade applications hosted on wireless devices like cellular telephones and other mobile communication devices, personal digital assistants ("PDAs"), and personal computers.

Figure 1:
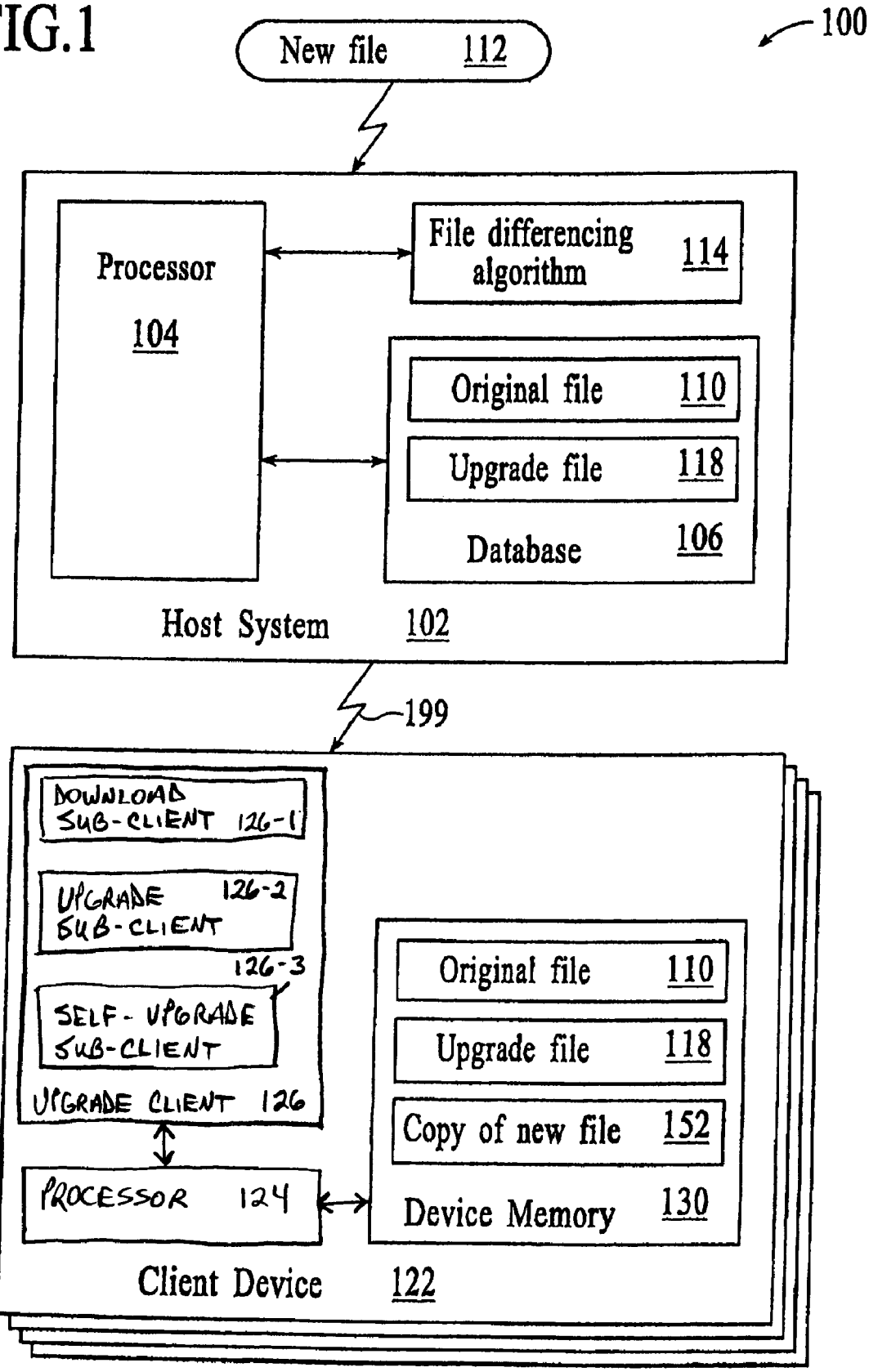
FIG. 1 is a block diagram of a file upgrade system including an upgrade client, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 126 is first introduced and discussed with respect to FIG. 1).

DETAILED DESCRIPTION

Systems and methods are described below that provide fail-safe self-upgrades of upgrade clients (also referred to as "upgrade applications") in client devices including wireless and/or mobile devices. These systems and methods form a self-upgrading upgrade client that includes a dedicated self-upgrade sub-client. The self-upgrade sub-client allows an upgrade client hosted on a mobile device to self-upgrade software or applications of the upgrade client while running in order to correct errors in the software, update the software version, and update a communication protocol, to name a few. The self-upgrade sub-client therefore overcomes the need to return the client device to the device manufacturer or service provider for a required upgrade of the upgrade client. In the event of a failure during a software upgrade that prevents successful completion of the upgrade, the upgrade system of an embodiment recovers the client devices to a pre-grade state. The upgrade system subsequently either resumes or re-initiates the upgrade that was in progress at the time of the failure.

In the following description, numerous specific details are introduced to provide a thorough understanding of, and enabling description for, embodiments of the self-upgrading upgrade client. One skilled in the relevant art, however, will recognize that the self-upgrading upgrade client can be practiced without one or more of the specific details, or with other components, systems, etc. In other instances, well-known structures or operations are not shown, or are not described in detail, to avoid obscuring aspects of the self-upgrading upgrade client.

FIG. 1 is a block diagram of a file upgrade system 100, under an embodiment. Generally, the file upgrade system 100 includes a first computer system 102, or host system, and one or more second computer systems including client devices or computers 122. The host system 102 and the client devices 122 each include at least one processor 104 and 124, respectively, operating under program control, but are not so limited. The host system 102 and the client devices 122 communicate via a communication path 199. These computer systems 102 and 122 include any collection of computing devices operating together, as is known in the art. The computer systems 102 and 122 can also include components within a larger computer system.

The processor 104 of the host system 102 couples among a database 106 and a file differencing algorithm 114, under program control. Alternatively, various other components of the host system 102 can couple among the processor 104, the database 106, and the file differencing algorithm 114 and provide file updating functions under program control. While one processor 104, one database 106, and one file differencing algorithm 114 are shown, various alternative embodiments include any number and/or type of each of these components coupled in various configurations contemplated by one skilled in the art. Further, while the processor 104, database 106, and file differencing algorithm 114 are shown as separate blocks, some or all of these blocks can be monolithically integrated onto a single chip, distributed among a number of chips or components of a host system, and/or provided by some combination of algorithms. The file differencing algorithm 114 can be implemented in software algorithm(s), firmware, hardware, and any combination of software, firmware, and hardware. The term "processor" as generally used herein refers to any logic processing unit, such as one or more CPUs, digital signal processors ("DSPs"), application-specific integrated circuits ("ASIC"), etc.

Likewise, the client devices 122 of an embodiment include a processor 124 coupled among a device memory 130 and an upgrade client 126, under program control. Alternatively, various other components of the client devices 122 can couple among the processor 124, the device memory 130, and the upgrade client 126 and provide file updating functions under program control. While one processor 124, one device memory 130, and one upgrade client 126 are shown, various alternative embodiments include any number and/or type of each of these components coupled in various configurations contemplated by one skilled in the art. Further, while the processor 124, device memory 130, and upgrade client 126 are shown as separate blocks, some or all of these blocks can be monolithically integrated onto a single chip, distributed among a number of chips or components of a host system, and/or provided by some combination of algorithms. The algorithm or applications of the upgrade client 126 can be implemented in software algorithm(s), firmware, hardware, and any combination of software, firmware, and hardware. The device memory can include any number and/or combination or memory types including ROM and random access memory ("RAM"), but is not so limited.

The communication path 199 includes any medium for communicating or transferring files among the computer systems 102 and 122. Therefore, this path 199 includes wireless connections, wired connections, and hybrid wireless/wired connections. The communication path 199 also includes couplings or connections to networks including local area networks ("LANs"), metropolitan area networks ("MANs"), wide area networks ("WANs"), proprietary networks, interoffice or backend networks, and the Internet. Furthermore, the communication path 199 includes removable fixed mediums like floppy disks, hard disk drives, and CD-ROM disks, as well as flash memory, Universal Serial Bus ("USB") connections, RS-232 connections, telephone lines, buses, and electronic mail messages.

The host system 102 and the client devices 122 each include an original version 110 of an electronic file, referred to herein as the original file 110 or the old file. The host system 102 stores the original file 110 in a database 106 or other memory area or combination of memory areas or devices, but is not so limited. The client devices 122 store the original file 110 in device memory for use in operation.

At such time as a software provider upgrades the original file 110, for example to provide additional functionality or to fix a software bug, a new version 112 of the electronic file is generated. The new version 112 of the electronic file is referred to herein as the new file 112. The new file 112 is generally an updated or revised version of the original file 110, but is not so limited. The software provider transfers the new file 112 to the host system 102.

The electronic files 110 and 112 include software files including dynamic link library files, shared object files, embedded software components ("EBSCs"), firmware files, executable files, data files including hex data files, system configuration files, and files including personal use data, but are not so limited. Since any type of file can be regarded as a byte stream, hereafter a file can be described as a byte stream.

Components of the host system 102 including at least one processor 104 receive and process the new file 112 in order to generate upgrade information for use in upgrading the hosted original files 110 of the client devices 122. In an embodiment, the processor 104 generates an upgrade file 118 for use in transferring information of the upgrades to the client devices 122. The upgrade file 118 can include a difference file that codes differences between the new file 112 and the original file 110 or, alternatively, can include any number and/or combination of components or modules of the new file 112. The host system 102 provides the upgrade information to the client devices 122 via transfer of the upgrade file 118 over the communication path 199.

In embodiments where the upgrade file 118 includes a difference file, components of the host system 102 including the processor 104 and the file differencing algorithm 114 process a comparison between the new file 112 and the corresponding original file 110, thereby calculating the differences between the new file 112 and the original file 110. The file differencing algorithm 114 generates the difference file during the comparison and writes the difference file to the upgrade file 118.

The upgrade file 118 is transferred or transmitted to the client devices 122 via the communication path 199. Prior to transfer, the upgrade file 118 may be compressed using any of a number of compression techniques known in the art, but is not so limited.

Components of the client devices 122 including the processor 124 and the upgrade client 126 receive the upgrade file 118 and control the upgrade of the original file using the upgrade file 118. The upgrade client 126 of the client device 122 includes at least one of a download sub-client ("SC") ("download SC") 126-1, an upgrade SC 126-2, and a self-upgrade SC 126-3. The download SC 126-1 functions to download or receive files transferred from the host system 102. The upgrade SC 126-2 uses information of the transferred files received from the host system 102 to perform upgrades to software of the client device 122. The self-upgrade SC 126-3 functions to upgrade software of the upgrade client 126. The self-upgrade SC 126-3 of an embodiment is stored in a different physical memory block or area than either of the download SC 126-1 or the upgrade SC 126-2. The software of the upgrade client 126 includes but is not limited to software of the download SC 126-1, the upgrade SC 126-2, and the self-upgrade SC 126-3.

In an embodiment, the upgrade client 126, including components of the download SC 126-1, the upgrade SC 126-2, and the self-upgrade SC 126-3, processes information of the upgrade file 118 along with the hosted original file 110 to generate a copy of the new file 152. This copy of the new file 152 is subsequently used by the upgrade client 126 to upgrade 154 the targeted original file 110 hosted on the client devices 122. The upgrade client 126 of an embodiment uses numerous methods to update EBSCs depending on the file type to be updated and the resources allocated by the client device manufacturer to support these updates, as described below and in the Related Applications. Upon completion of this update process, the original file 110 now stored on the client devices 122 is the same as the new file 112 received in the host system 102.

Figure 2:
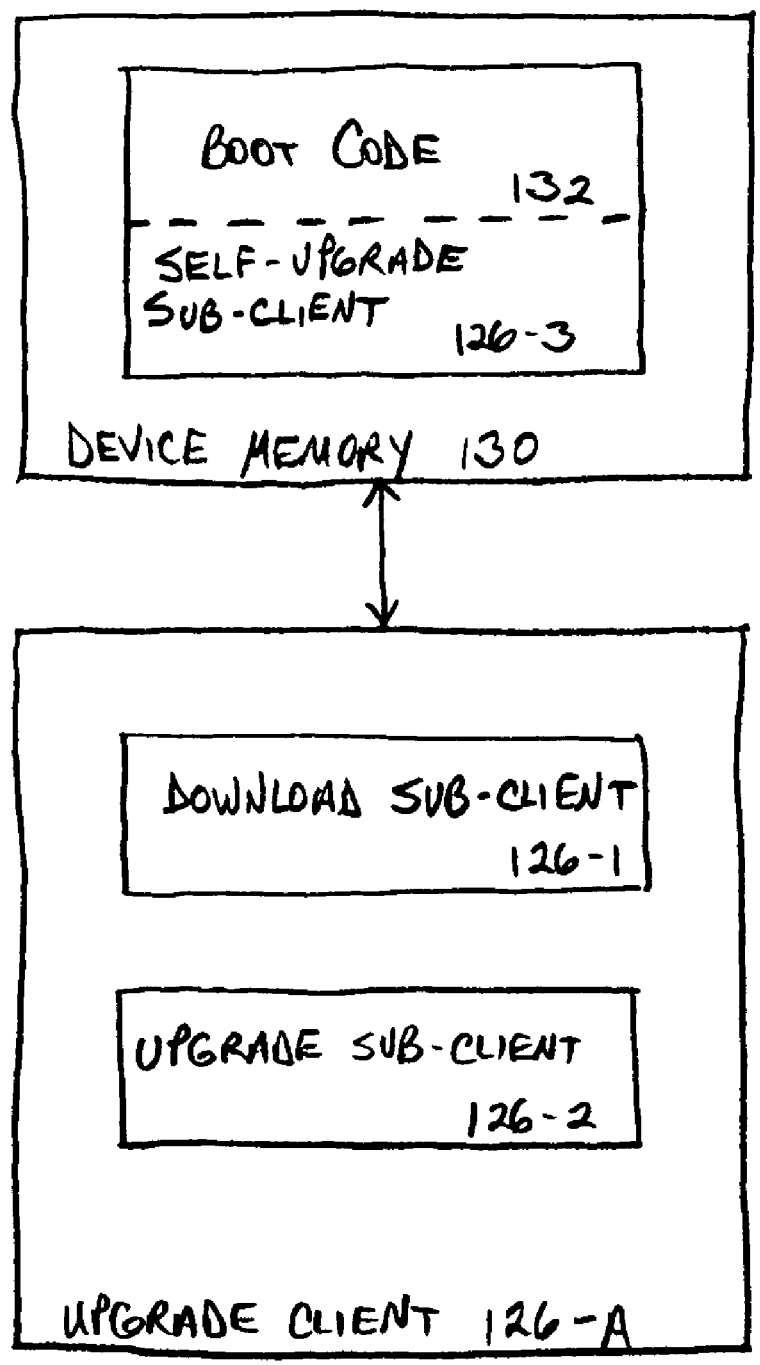
FIG. 2 is a block diagram of an upgrade client, under an alternative embodiment.

Alternative embodiments of the upgrade client 126 may host the self-update SC 126-3 with other components of the device operating system. As one example, the self-update SC 126-3 may be a component of the device boot code or stored in device memory adjacent the boot code. FIG. 2 is a block diagram of an upgrade client 126-A, under an alternative embodiment. The upgrade client 126-A of this alternative embodiment includes at least one of a download sub-client SC 126-1, an upgrade SC 126-2, and a self-upgrade SC 126-3. The self-upgrade SC 126-3 is a component of the device boot code 132 and/or stored in device memory 130 adjacent the boot code 132, but is not so limited. Various other alternative embodiments may locate the self-update SC 126-3 in any of a number and/or combination of areas of the device memory 130.

Those skilled in the relevant art will appreciate that those functions associated with the upgrade system 100 as well as the other functions and methods described herein with reference to the upgrade system 100 can be performed by components of the host system 102, components of the client devices 122, or distributed among any combination of components of the host system 102 and the client devices 122. Components of the host system 102 and client devices 122 can be implemented as ASICs, by DSP integrated circuits, and/or through conventional programmed logic arrays or circuit elements. The embodiments described herein can be implemented using any combination of hardware, firmware, and software running on one or more processors, where the software can be stored on any suitable computer-readable medium, such as microcode stored in a semiconductor chip, on a computer-readable disk, or downloaded from a server and stored locally at a client.

Figure 3:
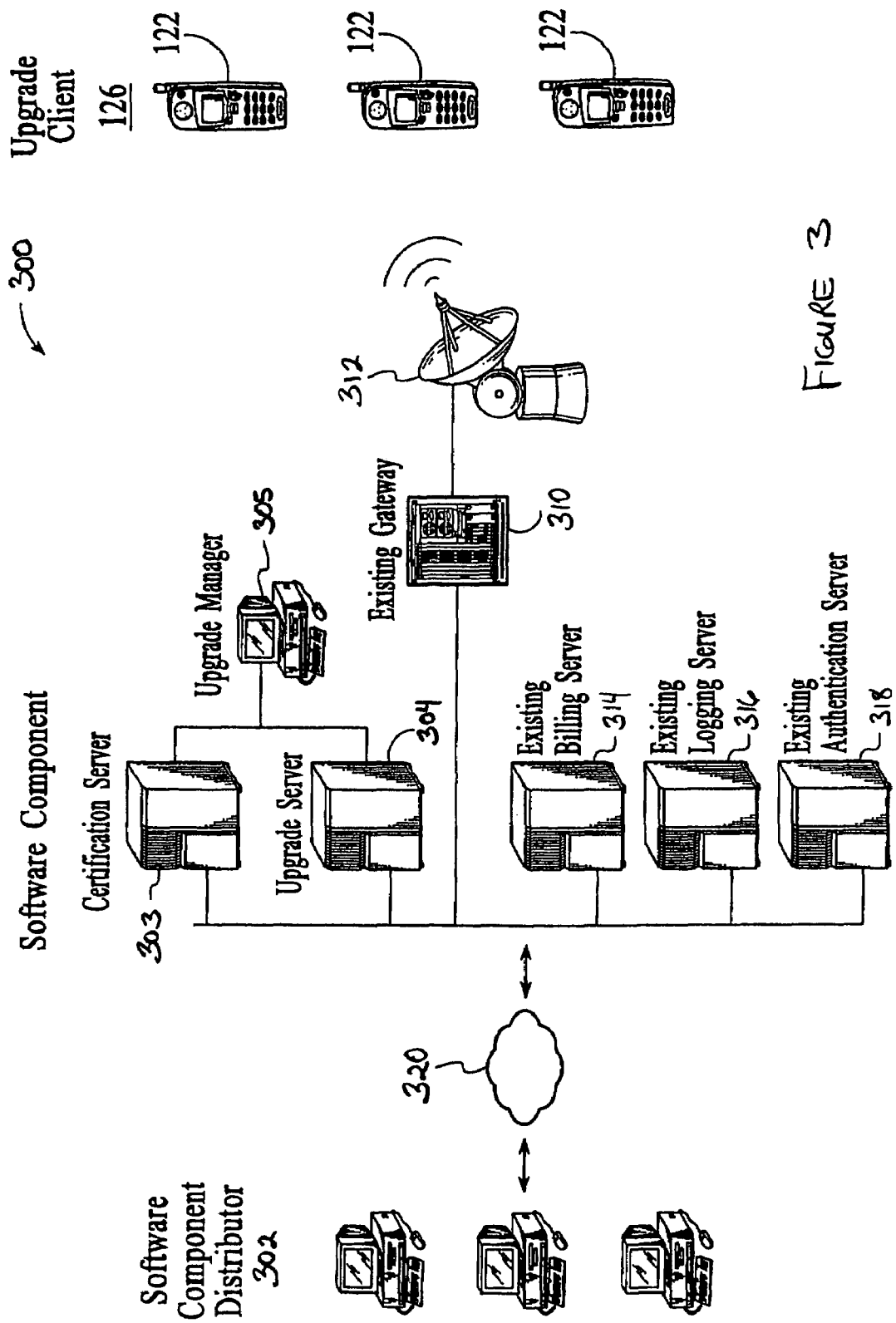
FIG. 3 is a block diagram of an example service provider infrastructure including components of the file upgrade system of an embodiment.

FIG. 3 is a block diagram of an example service provider infrastructure 300 including components of the file upgrade system 100 of an embodiment. In this embodiment the service provider infrastructure is described in the context of a cellular telephone network or infrastructure, but alternative embodiments are not so limited. The service provider infrastructure 300 includes, but is not limited to, a Software Component Distributor ("SCD") 302, service provider upgrade components 303-305, and an upgrade client 126 hosted on the client devices 122. The service provider upgrade components 303-305 include an upgrade server 304 coupled among a software component certification server 303 and an upgrade manager 305.

With further reference to FIG. 1, the SCD 302 of an embodiment of the service provider infrastructure 300 includes components or functions of the host system 102. In alternative embodiments, the service provider upgrade components 303-305 host components or functions of the host system 102. In other alternative embodiments the components or functions of the host system 102 are distributed among components of the SCD 302 and the service provider upgrade components 303-305.

The service provider infrastructure 300 of an embodiment supports numerous types of software file or component upgrades on client devices 122 including mobile electronic devices, mobile communication devices, cellular telephones, personal digital assistants, computers, and other processor-based devices via the upgrade system components and various mechanisms of the service provider's wireless infrastructure. These systems function by receiving new and revised software from a software distributor, generating an upgrade file from the new software, and transferring the upgrade file to the client devices 122 via the service provider infrastructure. The upgrade client 126 of the client devices 122 uses the upgrade file to update the targeted software hosted on the client devices 122.

The SCD 302 of an embodiment provides a user interface by which software providers package and release new embedded device software components. Functions of the SCD 302 include registering device information and submitting device information to the software component certification server. Also, the SCD 302 receives new and original EBSCs, calculates or generates file differences using the new and original EBSCs, registers and packages embedded software, and submits embedded software packages to the software component certification server 303. The new or revised software, following release, is provided to the service provider upgrade components 303-305 via a wired, wireless, or hybrid wired/wireless network coupling or connection 320, but is not so limited.

The SCD 302 of an embodiment is hosted on processing systems of the client device manufacturers. In an alternative embodiment, the SCD 302 is hosted on processing systems of an application or system software provider. In another alternative embodiment, the SCD 302 is hosted on processing systems of the service carrier or provider, for example hosted on or distributed among the upgrade components 303-305.

The service provider upgrade components 303-305 are coupled among the software component distributor 302, the client devices 122, and the existing components of the service provider's infrastructure 310-318, including the existing gateway 310 and communication infrastructure 312, billing server 314, logging server 316, and authentication server 318.

The software component certification server 303 provides an interface to the manufacturers of client devices and, thus, receives new device information on embedded software packages from device manufacturers. The software component certification server 303 also repackages and distributes approved software packages to upgrade servers.

The upgrade manager 305, while functioning as an interface among the software component certification server 303 and the upgrade server 304, configures software and data packaging for optimal device management, schedules remote change notifications, and controls the update policy monitor system. Moreover, the upgrade manager 305 provides integration with the systems of the existing infrastructure.

The upgrade server 304 provides capabilities including authenticating, connecting, and communicating with mobile client devices 122 to perform embedded software component upgrades. Communication with client devices 122 can occur via couplings 312 with the client devices 122 that include wireless couplings, wired couplings, hybrid wired/wireless couplings, and other network coupling types, as appropriate to the corresponding service provider. In addition, the upgrade server 304 supports existing billing, data collection, and logging services of the service provider.

As an example of communications among the upgrade server 304 and client devices 122, when an upgrade file is available for transfer to a client device 122 from the upgrade server 304, the server 304 sends a user notification to notify the client device user that there are software components available for updating. The user notification can take the form of a text message via a Short Message Service ("SMS") push protocol, Hypertext Transfer Protocol ("HTTP"), or Wireless Application Protocol ("WAP"), but is not so limited. Upon receiving confirmation from the handset users, the upgrade server 304 uses the original handset data communication protocol to send the upgrade file to the requesting device.

In response to receipt of the confirmation from the device, the upgrade server 304 authenticates and authorizes the user and/or requesting device, and verifies prerequisite capabilities and limitations of the requesting device. Following authentication the upgrade server 304, as the manager of client device configuration data, identifies the current versions of embedded software components of the requesting device, identifies and transfers appropriate delta files to the requesting device, logs the status of the upgrade transaction, and reports the results to the upgrade manager 305. In addition, the upgrade server 304 activates/deactivates the software upgrade service over the air, and notifies remote users of software changes.

With reference to FIG. 1, the upgrade client 126 is embedded in the client devices 122, but is not so limited. The upgrade client 126 stores and maintains configuration data of the client devices 122, and provides for the maintenance and upgrading of embedded device software components. The upgrade client 126 supports a simple user interface and is incorporated into mobile device software. Upon execution, the upgrade client 126 automatically detects the remote change of any embedded software components, notifies users of an embedded software component upgrade, and upgrades a software component based on the carriers and/or users control, as appropriate for a particular service provider.

The upgrade system 100 and service provider infrastructure 300 of an embodiment support numerous types of software file or component update, including updates to executable files, byte stream files, and data files, but are not so limited. The executable files, or image files, include software files used in the client device to execute tasks, for example the operating system ("OS"), hardware device drivers, and K Virtual Machine ("KVM") files. The byte stream files include files used by other executable files, for example, icon files, logo files, and MP3 files. Data files include files containing personal use data, and handset reference data, for example the calibration configuration files, the Protocol Independent Multicast ("PIM") files, and system configuration files.

The upgrade client 126 of an embodiment uses numerous methods to update EBSCs depending on the file type to be updated and the resources allocated by the client device manufacturer to support these updates, as described in the Related Applications. These update methods of an embodiment include non-critical component updates, critical component updates, and update client component updates, where these categories are based on the functions provided by the software components targeted for update.

Non-critical components include embedded software components (EBSCs) that are easily recovered over the air following a failure during the update process. Examples of non-critical components include browsers and KVM files, but are not so limited. Critical components include software components used in the update procedure or the EBSCs critical to device operation. Further, critical components include EBSCs that are not easily recovered over the air following a failure during the update process. Examples of critical components include the operating system files, protocol stacks, the upgrade client files, communication libraries, and display or LCD driver files, but are not so limited. Update client component updates include EBSCs of the update client 126.

The client devices 122 determine the status of numerous device parameters prior to participating in an update procedure. This is done in order to pre-qualify the device for the update procedure, or verify that the condition of the client device is such that the update procedure can be completed once begun. The client device pre-qualification includes, but is not limited to, determining if the client device is in a cradle or charging mode, if the client device is connected to a serial cable, if the state of battery charge is sufficient to perform the updating process, if the Received Signal Strength Indication ("RSSI") or signal strength is sufficient for the data transfer, and if the targeted EBSC is currently in use.

In spite of pre-qualifying the client devices 122 for the update procedure, failures in the update can occur as a result of hardware failures, power (battery) failures, and failures of the network connection, to name a few. The upgrade system 100 of an embodiment provides fail-safe software file updates by recovering the client devices 122 to a pre-update state and either resuming or re-initiating the update that was in progress at the time of the failure. Components of the upgrade server 304 and the upgrade client 126 include an automatic failure recovery mechanism that provides the fail-safe updates, as described below.

The client device of an embodiment stores data of the relationship among the EBSCs of the client device software, referred to herein as file configuration data, in a module-based memory management ("MBMM") EBSC. The MBMM EBSC is referred to herein as a configuration file. The configuration data also includes upgrade status information. The upgrade status information includes detailed information relating to the status of upgrades to client device software including, for example, information as to where a failure or error occurred during an attempted upgrade. Because of the importance of the configuration data to the operation of the client device, the upgrade client provides access to accurate configuration data as well as maintains the configuration data through file upgrades, as follows.

Figure 4:
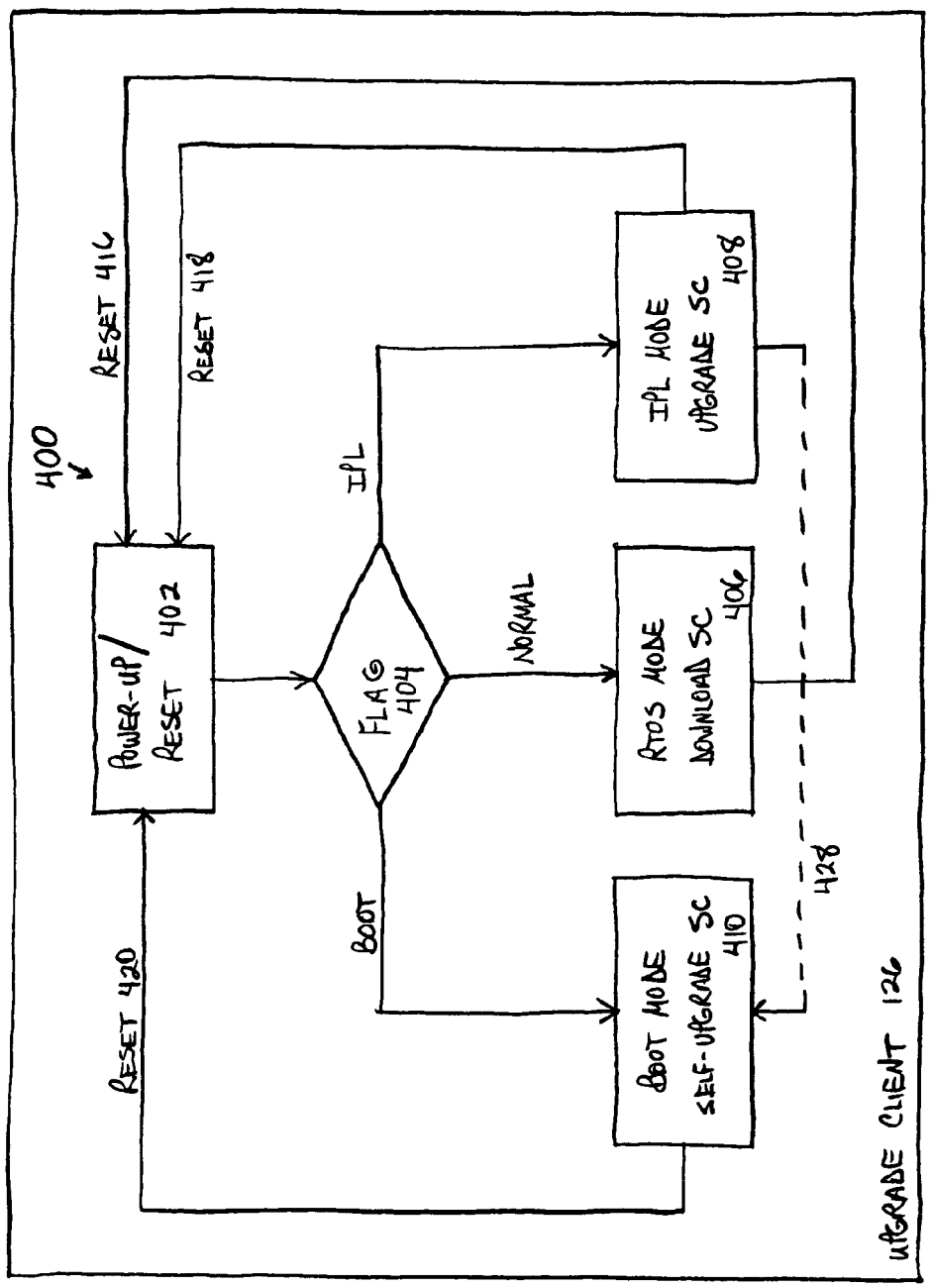
FIG. 4 is a flow diagram for performing file upgrades that include upgrades to upgrade client components, under an embodiment.

The upgrade client of an embodiment automatically upgrades EBSCs of the non-critical, critical, and upgrade client components hosted on the client device, as described herein and in the Related Applications. In performing the upgrades of these various software components, as an example, FIG. 4 is a flow diagram 400 for performing file upgrades that include upgrades to upgrade client components, under an embodiment. At such time as the client device is powered up or reset, at block 402, the upgrade client 126 of an embodiment evaluates the content of a mode register, at block 404. When the mode register content indicates that an upgrade file is available for download, the upgrade client 126 transitions to an RTOS mode and in response activates the download SC of the upgrade client 126, at block 406. The download SC functions to receive or download the available upgrade file into one or more areas of client device memory as described below. The upgrade client 126 initiates a reset 416 following receipt of the upgrade file, and operation returns to block 404 (via block 402) where the upgrade client 126 further evaluates the mode register content.

The content of the mode register is manipulated by the upgrade client 126 of an embodiment in response to information of the upgrade file that indicates the type of upgrade information included in the upgrade file. The information of the upgrade file that indicates the type of upgrade information included in the upgrade file may be found in a header section of the upgrade file, but alternative embodiments can include this information in other parts of the upgrade file. As an example, the upgrade client 126 sets a first pre-specified value in the mode register in response to an upgrade file that includes upgrades of non-critical or critical components. Further, the upgrade client 126 sets a second pre-specified value in the mode register in response to an upgrade file that includes upgrades of upgrade client components.

Upon evaluation of the mode register, at block 404, the upgrade client 126 transitions to an initial program load ("IPL") mode, at block 408, when the mode register content indicates that a received upgrade file includes information for use in upgrading non-critical components and/or critical components of the client device. In the IPL mode the upgrade client 126 activates the upgrade SC of the upgrade client. The upgrade SC functions to upgrade the non-critical components and/or critical components using contents of the upgrade file as described in the Related Applications. The upgrade client 126 of an embodiment initiates a reset 418 upon completion of the upgrades, and operation returns to block 404 where the upgrade client 126 further evaluates the status of the mode register. However, the upgrade client 126 of an alternative embodiment, instead of initiating the reset 418, may branch 428 directly to a boot mode 410 when information of the upgrade file indicates the upgrade file includes information for upgrading upgrade client components, but the embodiment is not so limited.

In response to the upgrade client reset 418 following completion of upgrades to non-critical and/or critical components of the client device, the upgrade client 126 again evaluates the mode register, at block 404. The upgrade client 126 transitions to the boot mode, at block 410, when the mode register content indicates that a received upgrade file includes information for use in upgrading upgrade client components. In the boot mode the upgrade client 126 activates the self-upgrade SC of the upgrade client, at block 410. The self-upgrade SC functions to upgrade the upgrade client components using contents of the upgrade file as described below with reference to FIG. 5 and FIG. 6. The upgrade client 126 of an embodiment initiates a reset 420 upon completion of the upgrade client component upgrades, and operation returns to block 404 where the upgrade client 126 further evaluates the mode register.

Figure 5:
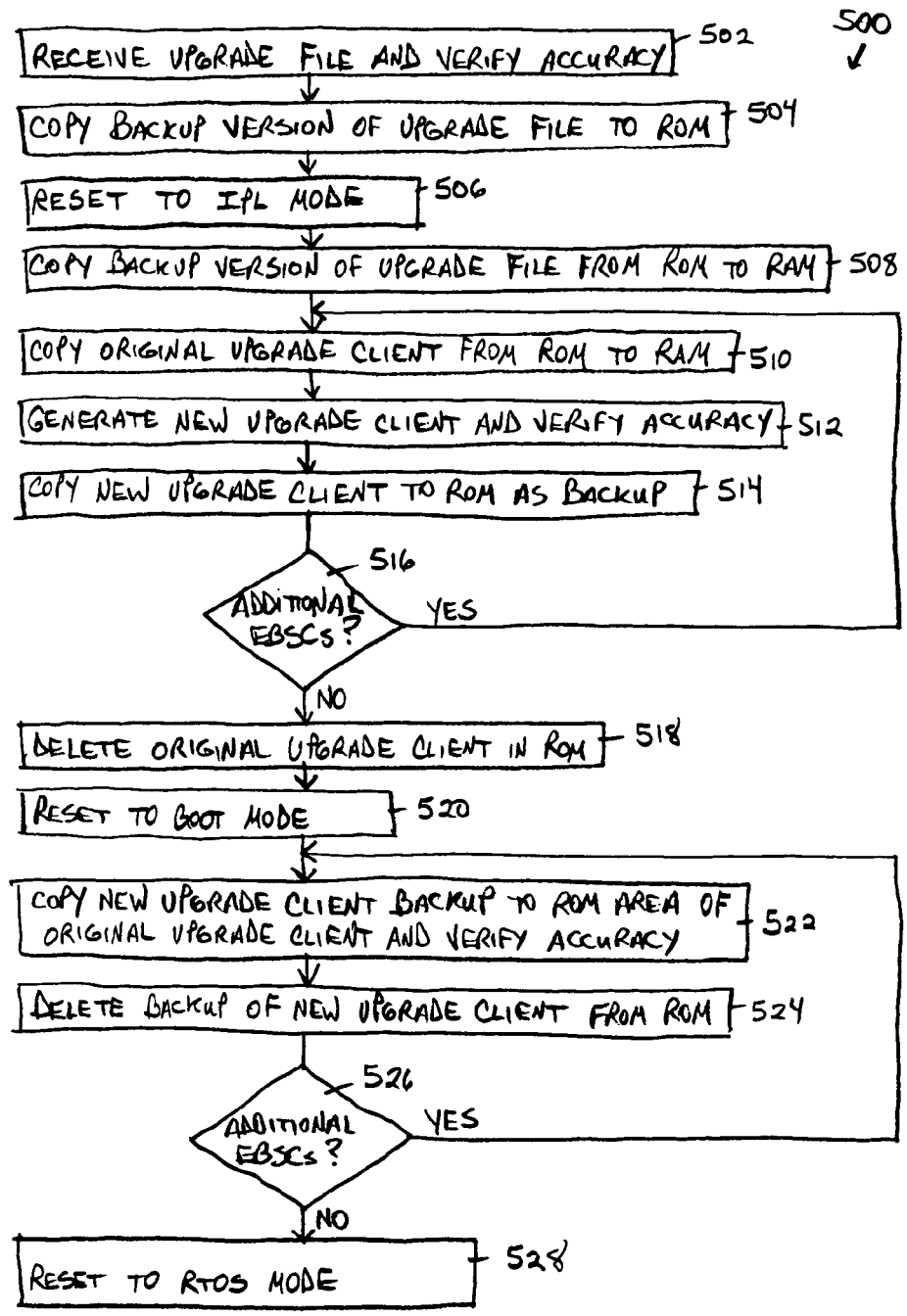
FIG. 5 is a flow diagram for upgrading software components of an upgrade client, under an embodiment.

The performance of file upgrades in an embodiment includes self-upgrades of the upgrade client of a client device, as described above. The self-upgrading upgrade client includes a dedicated self-upgrade sub-client along with corresponding APIs and drivers that allows the upgrade client to self-upgrade its software while running. FIG. 5 is a flow diagram 500 for upgrading software components of an upgrade client, under an embodiment. This self-upgrading process 500 is provided as one example of operations of a self-upgrading upgrade client as many alternative embodiments are possible.

Self-upgrading of the upgrade client begins with the availability of an upgrade file that includes information for use in upgrading upgrade client components of the client device. As described above with reference to FIG. 4, the upgrade client transitions to an RTOS mode in which it activates the download SC. The download SC receives the available upgrade file via an OTA coupling, at block 502, and stores the received upgrade file in one or more areas of client device memory. The received upgrade file includes a difference file for use in upgrading an original EBSC of the upgrade client where the upgrade client includes the download SC, the upgrade SC, the self-upgrade SC.

In response to receipt of the upgrade file, the download SC also verifies the accuracy of the upgrade file contents using a verification algorithm. While the embodiments described herein include the use of verification processes or algorithms that use, for example, checksum values or Cyclic Redundancy Codes ("CRCs"), the embodiments may use any verification process or algorithm contemplated by one skilled in the art. The verification calculation or algorithm recalculates the checksum or CRC, as appropriate, and compares it to a corresponding value stored in the client device with the original configuration data. If the verification shows the upgrade file contents to be free of errors, then the download SC proceeds with upgrading the original upgrade client EBSC by copying a backup version of the upgrade file to one or more areas of client device ROM, at block 504.

The upgrade client initiates a reset following receipt of the upgrade file, at block 506. Following this reset, as described above, the upgrade client transitions to an IPL mode during which non-critical and/or critical component upgrades are performed by the upgrade SC when it is determined that a received upgrade file includes information for use in upgrading non-critical components and/or critical components. Following completion of non-critical and/or critical component upgrades, or when it is determined that a received upgrade file only includes information for use in upgrading upgrade client components, the upgrade SC proceeds with upgrades of the upgrade client components, as described above with reference to FIG. 4.

Continuing with self-upgrading of the upgrade client components, the upgrade SC copies the backup version of the upgrade file from ROM to RAM, at block 508. The upgrade SC copies the original upgrade client EBSC targeted for upgrade from ROM to RAM, at block 510. The upgrade SC generates the new upgrade client EBSC using the original upgrade client EBSC and the corresponding information of the upgrade file stored in client device RAM, at block 512. The upgrade SC also performs verification calculations on the new upgrade client EBSC, but is not so limited. The upgrade SC copies the new upgrade client EBSC of the upgrade client to ROM for use as a backup to the new upgrade client EBSC, at block 514.

The upgrade SC determines whether additional upgrade files are available for use in upgrading additional EBSCs of the upgrade client, at block 516. When additional upgrade files are available, operation of the upgrade SC returns to block 510 to process the additional files as described above with reference to blocks 510, 512, and 514. Upon completing processing of all upgrade files, the upgrade SC deletes or erases the original upgrade client EBSC of the upgrade client from ROM, at block 518, and resets the client device to a boot mode, at block 520.

Following this reset, the upgrade client transitions to the boot mode during which the upgrade client activates the self-upgrade SC as described above with reference to FIG. 4. In the boot mode, the self-upgrade SC copies the new upgrade client EBSC backup from ROM into the area of ROM previously occupied by the original upgrade client EBSC (erased) and verifies the accuracy of the new upgrade client EBSC as copied, at block 522. The self-upgrade SC deletes or erases the backup copy of the new upgrade client EBSC from ROM, at block 524.

The self-upgrade SC determines whether additional upgrade files are available for use in upgrading additional upgrade client EBSCs, at block 526. When additional upgrade files are available, operation of the self-upgrade SC returns to block 522 to process the additional files as described above with reference to blocks 522 and 524. Upon completing processing of all upgrade files corresponding to the upgrade client, the self-upgrade SC resets the client device to the RTOS mode, at block 528.

Figure 6:
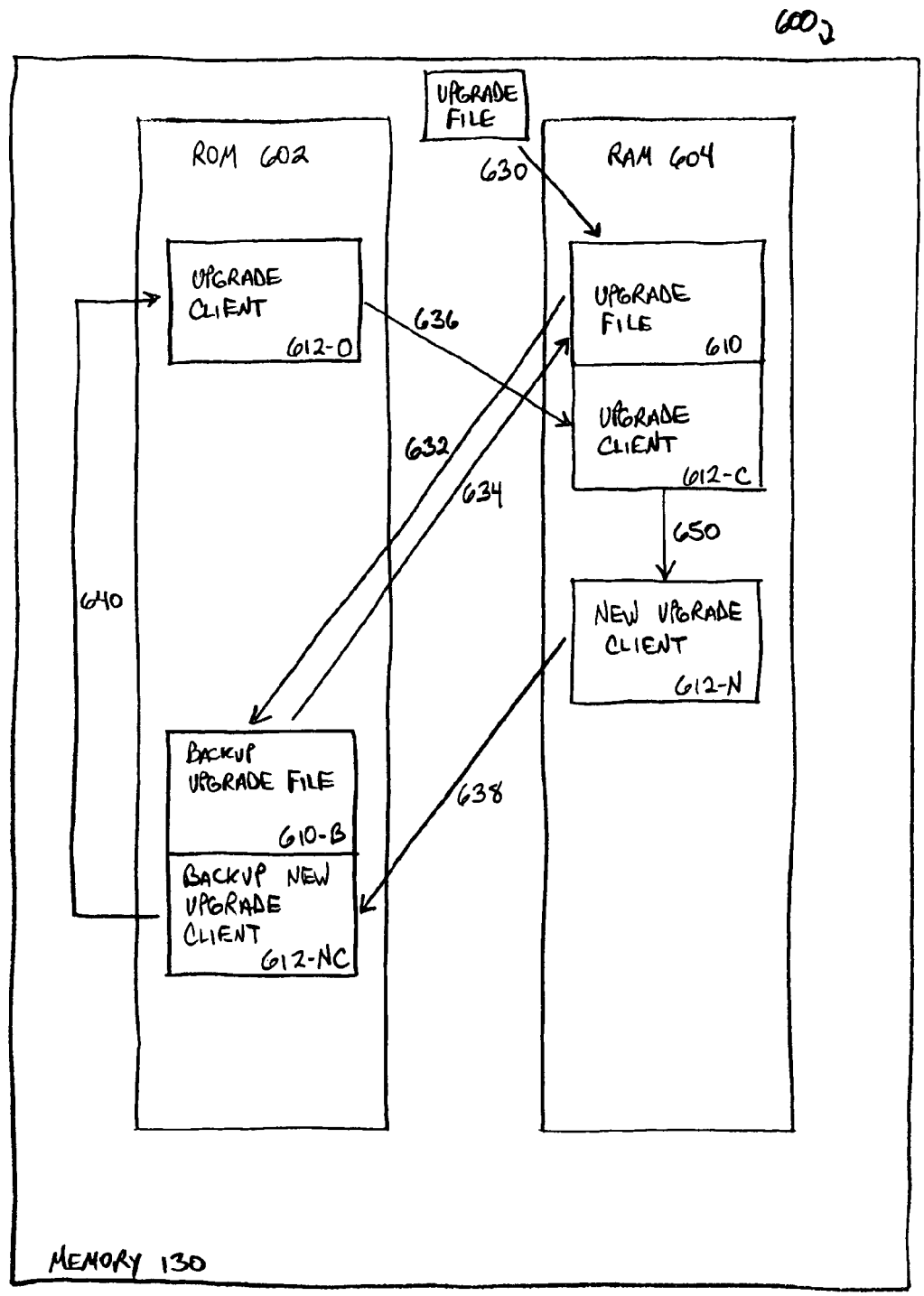
FIG. 6 is a block diagram depiction of upgrade client software component upgrades using difference files, under the embodiment of FIG. 5 and FIG. 6.

FIG. 6 is a block diagram 600 depiction of upgrade client software component upgrades using difference files, under the embodiment of FIG. 5 and FIG. 6. The upgrade process of this example uses storage locations in both ROM 602 and RAM 604 areas of the client device memory 130 (FIG. 1), but alternative embodiments can use any combination of areas in the client device memory 130 or any number of different segments of the same memory area.

The upgrade process begins when the upgrade client receives an upgrade file 610 for use in upgrading an original EBSC 612 corresponding to the upgrade file 610. The update client of an embodiment receives the upgrade file 610 via an OTA coupling or connection but is not so limited. For purposes of this example, the upgrade file 610 includes a difference file for use in upgrading an original EBSC of the upgrade client but, alternatively, the upgrade file 610 can include difference files and entire new files or new EBSCs. The upgrade client stores or writes 630 the upgrade file 610 to RAM 604 and verifies the accuracy of the upgrade file contents using a verification algorithm. If the upgrade file 610 is free of errors, the upgrade client proceeds with upgrading the original EBSC 612-O by generating and storing 632 a backup version of the upgrade file 610-B to one or more areas of client device ROM 602.

Following a reset to an IPL mode, as described above, the upgrade client copies or writes 634 the backup version of the upgrade file 610-B from ROM 602 to RAM 604. The upgrade client then copies 636 the original upgrade client EBSC 612-O targeted for upgrade from ROM 602 to RAM 604 as copy 612-C. The upgrade client generates 650 the new upgrade client EBSC 612-N using the copy 612-C of the original upgrade client EBSC and the corresponding information of the upgrade file 610 stored in client device RAM 604. The upgrade client also performs verification calculations on the new upgrade client EBSC 612-N, but is not so limited. The upgrade client copies 638 the new upgrade client EBSC 612-N to ROM 602 as copy 612-NC for use as a backup to the new upgrade client EBSC 612-N.

Upon completing processing of all upgrade files, the upgrade client deletes or erases the original upgrade client EBSC 612-O from ROM 602, and resets the client device to a boot mode, as described above. Following this reset, the upgrade client copies 640 the new upgrade client EBSC backup 612-NC into the area of ROM 602 previously occupied by the original upgrade client EBSC 612-O (erased) and verifies the accuracy of the new upgrade client EBSC as copied. The upgrade client then deletes or erases the backup copy of the new upgrade client EBSC 612-NC from ROM 602.

The upgrade client determines whether additional upgrade files are available for use in upgrading additional upgrade client EBSCs. When additional upgrade files are available, operation of the upgrade client continues to process the additional files as described above. Upon completing processing of all upgrade files corresponding to the upgrade client, the upgrade client again resets the client device.

Figure 7:
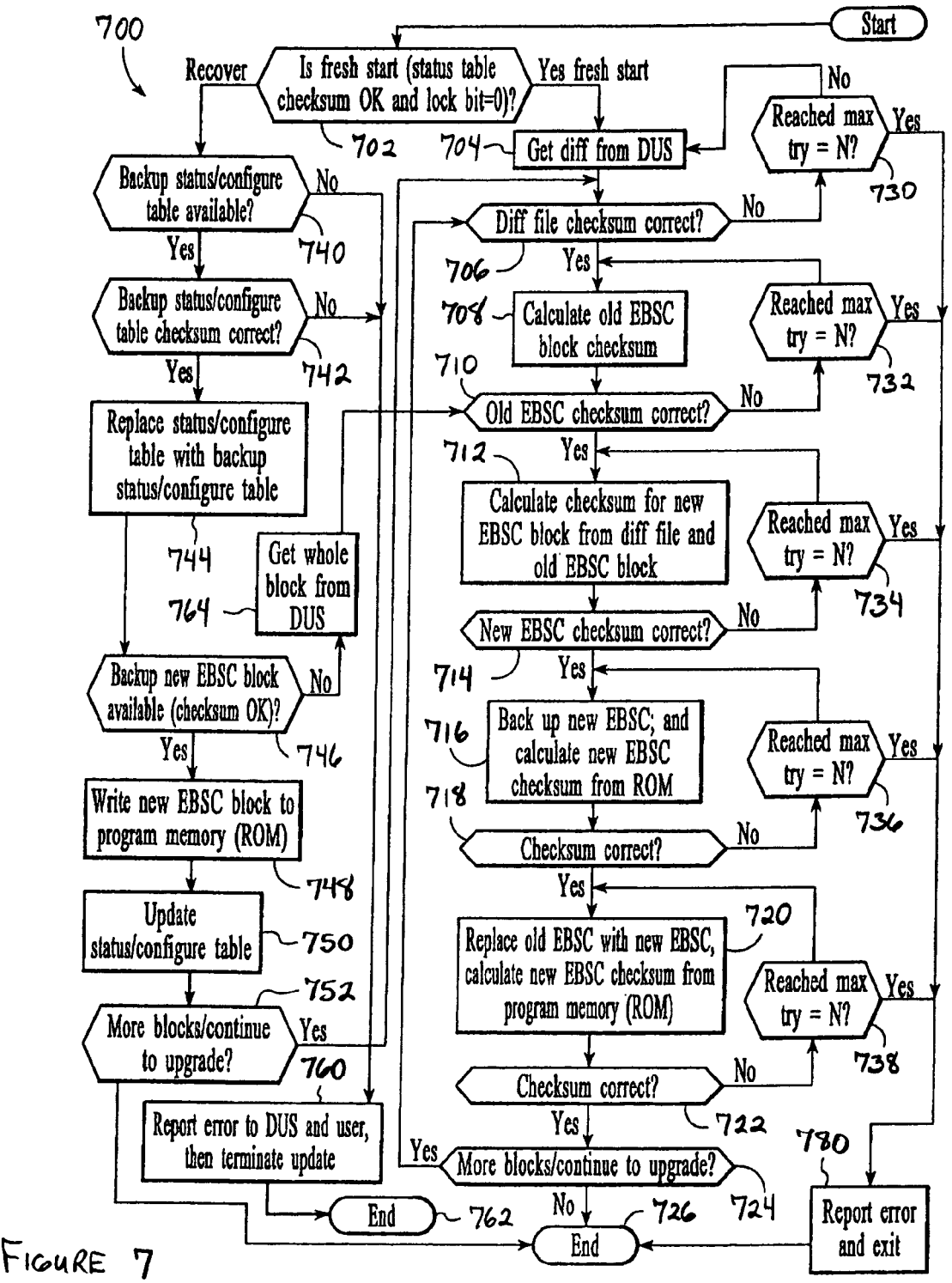
FIG. 7 is a flow diagram for recovering a client device from errors occurring during software component upgrades of an upgrade client, under an embodiment.

As described above, the client device of an embodiment is recoverable from errors occurring during software upgrades. FIG. 7 is a flow diagram 700 for recovering a client device from errors occurring during software component upgrades of an upgrade client, under an embodiment. In performing file upgrades, the upgrade client begins by determining whether the file upgrades are being performed for the first time in response to the availability of new files, or whether the client device is being recovered from errors that occurred during previous upgrade attempts, at block 702.

When performing file upgrades for the first time, the upgrade client receives an upgrade file in the form of a difference file for use in upgrading an original EBSC corresponding to the upgrade file, at block 704. In response to receipt of the difference file, the upgrade client uses the checksum value of the difference file to determine whether the difference file contents are free from errors, at block 706. This process of receiving the difference file and evaluating the accuracy of the file contents is repeated until either an error-free difference file is received, or until the process has been repeated a pre-specified number of times, N. Upon repeating the process the pre-specified number of times N without success, at block 730, the upgrade client uses resources of the client device to report the error to the client device user and the service provider's upgrade server, at block 740, and terminates the upgrade process, at block 726.

In response to the receipt of an accurate difference file, at block 704, the upgrade client verifies the accuracy of the original EBSC contents, at block 708. If the checksum value of the original EBSC is determined to be incorrect, at block 710, the process of calculating the checksum of the original EBSC is repeated until a correct checksum value is calculated, or until the process has been repeated a pre-specified number of times, N. Upon repeating the process the pre-specified number of times N without success, at block 732, the upgrade client uses resources of the client device to report the error to the client device user and the service provider's upgrade server, at block 780, and terminates the upgrade process, at block 726.

When the original EBSC contents are determined to be accurate, at block 710, the upgrade client generates the new EBSC using the original EBSC and the difference file, at block 712. The upgrade client also performs verification calculations on the contents of the new EBSC. If the checksum value of the new EBSC is determined to be incorrect, at block 714, the process of generating the new EBSC and calculating the checksum is repeated until a correct checksum value is calculated, or until the process has been repeated a pre-specified number of times, N. Upon repeating the process the pre-specified number of times N without success, at block 734, the upgrade client uses resources of the client device to report the error to the client device user and the service provider's upgrade server, at block 780, and terminates the upgrade process, at block 726.

When the upgrade client determines that the contents of new EBSC are accurate, at block 714, a backup version of the new EBSC is generated and written to device memory, at block 716. The accuracy of the backup version of the new EBSC is also verified using checksum values. If the checksum value of the backup version of the new EBSC block is determined to be incorrect, at block 718, the process of generating the backup version of the new EBSC and calculating the checksum is repeated until a correct checksum value is calculated, or until the process has been repeated a pre-specified number of times, N. Upon repeating the process the pre-specified number of times N without success, at block 736, the upgrade client uses resources of the client device to report the error to the client device user and the service provider's upgrade server, at block 780, and terminates the upgrade process, at block 726.

Upon verifying the accuracy of the backup version of the new EBSC, at block 718, the upgrade client replaces the original EBSC in the device ROM with the new EBSC, at block 720. Checksum calculations are performed on the new EBSC as written to the device ROM to verify the accuracy of the file. If the checksum value of the new EBSC is determined to be incorrect, at block 722, the process of writing the new EBSC to device ROM and calculating the checksum is repeated until a correct checksum value is calculated, indicating that the new EBSC was properly written to device ROM, or until the process has been repeated a pre-specified number of times, N. Upon repeating the process the pre-specified number of times N without success, at block 738, the upgrade client uses resources of the client device to report the error to the client device user and the service provider's upgrade server, at block 780, and terminates the upgrade process, at block 726.

Upon verifying the accuracy of the new EBSC as written to the device ROM, at block 722, the upgrade client determines whether additional difference files are available for use in upgrading corresponding original EBSCs, at block 724. Operation returns to block 706 to process any additional difference files; otherwise the upgrade process ends, at block 726.

When the upgrade client determines, at block 702, that the device is being recovered from errors that occurred during previous upgrade attempts, the upgrade client initiates recovery by determining whether a backup configuration file is available in the client device, at block 740. The backup configuration file includes backup configuration data. When backup configuration data is available, the upgrade client determines whether the backup configuration data is accurate by evaluating the associated checksum value, at block 742. If backup configuration data is not available in the client device, at block 740, or if backup configuration data is available and the checksum value indicates the data is in error, at block 742, the upgrade client uses resources of the client device to report the error to the client device user and the service provider's upgrade server, at block 760. The upgrade client then terminates the upgrade process, at block 762.

When error-free backup configuration data is available in the client device, the upgrade client writes the backup configuration data over the original configuration data in the original configuration file, at block 744. The upgrade client then determines the availability of a backup version of the new EBSC in the client device, at block 746.

If a backup version of the new EBSC is available in the client device, the upgrade client upgrades the original EBSC by writing the backup version of the new EBSC over the corresponding original EBSC in device memory, at block 748; the configuration data is subsequently upgraded in accordance with the new EBSC, at block 750. The upgrade client then determines whether additional difference files are available for use in upgrading other original EBSCs, at block 752. Operation returns to block 706 to process any additional difference files; otherwise the upgrade process ends, at block 726.

If a backup version of the new EBSC is found not to be available in the client device, at block 746, then the upgrade client retrieves the corresponding original EBSC from the upgrade server, at block 764. Upon receiving the original EBSC, the upgrade client proceeds with re-generating a new EBSC, at block 710, as described above.

Referring to FIGS. 4, 5, and 7, the operations of the flow diagrams are under control of at least one processor, but are not so limited. Each of the blocks depicted in these flow diagrams is of a type well known in the art, and can itself include a sequence of operations that need not be described herein. Those skilled in the relevant art can create source code, microcode, program logic arrays or otherwise implement the invention based on these flow diagrams and the detailed description provided herein. The algorithm or routine operating according to these flow diagrams is stored in non-volatile memory that forms part of the associated processors, in the associated memory areas, in removable media, such as disks, or hardwired or preprogrammed in chips, such as electronically erasable programmable ROM ("EEPROM") semiconductor chips, or in any combination of these components, but is not so limited.

The components of the upgrade client described above include any collection of computing components and devices operating together. The components of the upgrade client can also be components or subsystems within a larger computer system or network. The upgrade client components can also be coupled among any number of components (not shown), for example other buses, controllers, memory devices, and data input/output (I/O) devices, in any number of combinations. Functions of the upgrade client components can be distributed among any number/combination of other processor-based components. The memory systems described above include, for example, various memory systems known in the art.

The self-upgrading upgrade client of an embodiment includes a portable communication device comprising an upgrade client coupled to a processor, the upgrade client including an upgrade sub-client and a self-upgrade sub-client, wherein the upgrade client receives upgrade files over a wireless coupling, wherein the upgrade sub-client automatically upgrades electronic applications of the device using contents of the upgrade files, wherein the self-upgrade sub-client automatically upgrades electronic applications of the upgrade client using contents of the upgrade files.

The electronic applications of the upgrade client of an embodiment include electronic applications of the upgrade sub-client and the self-upgrade sub-client.

The upgrade client of an embodiment further comprises a download sub-client that controls receipt of the upgrade files, wherein the electronic applications of the upgrade client include electronic applications of the download sub-client.

The upgrades of an embodiment include at least one of repairing errors in the electronic files and providing additional electronic files.

The processor of an embodiment automatically recovers the portable communication device to at least one operational state in response to a failure during the automatic upgrades.

The portable communication device of an embodiment is at least one of a cellular telephone, a portable computing device, and a personal digital assistant.

The upgrade client of an embodiment includes one or more operating modes that include at least one of a real-time operating system (RTOS) mode, an initial program load (IPL) mode, and a boot mode. The upgrade sub-client of an embodiment automatically upgrades electronic applications of the device during the IPL mode. The self-upgrade sub-client of an embodiment automatically upgrades electronic applications of the upgrade client during the boot mode. The download sub-client of an embodiment automatically controls at least one of downloading and storing of the upgrade files during the RTOS mode.

The upgrade sub-client of an embodiment is in a first memory area of the device and the self-upgrade sub-client is in a second memory area of the device.

The self-upgrading upgrade client of an embodiment includes a method comprising at least one of receiving an upgrade file at an upgrade client of a portable device, wherein contents of the upgrade file include at least one of information to repair errors in software applications and information to upgrade functions provided by the software applications, automatically upgrading software applications of the portable device when the contents are targeted for the portable device software applications, and automatically upgrading software applications of the upgrade client when the contents are targeted for the upgrade client software applications.

The method of an embodiment further comprises selecting an operating mode of the upgrade client in response to at least one of availability of the upgrade file and the contents of the upgrade file. The operating modes of an embodiment include at least one of a real-time operating system (RTOS) mode, an initial program load (IPL) mode, and a boot mode. The RTOS mode of an embodiment includes downloading of the upgrade file by a download sub-client of the upgrade client. The IPL mode of an embodiment includes automatically upgrading the portable device software applications. The boot mode of an embodiment includes automatically upgrading the upgrade client software applications.

The receiving of a method of an embodiment further comprises at least one of storing the upgrade file in a first memory area of the portable device, and generating a backup version of the upgrade file in a second memory area. The first memory area of an embodiment is one or more regions of a random access memory, and the second memory area is one or more regions of a read-only memory.

The receiving of a method of an embodiment further comprises verifying the contents of the upgrade file by applying at least one error checking and correction process to the contents, the at least one error checking and correction process including use of at least one of cyclic redundancy codes (CRC) and checksum values.

Automatically upgrading the upgrade client software applications of an embodiment further comprises at least one of generating a backup upgrade client by copying the upgrade client software applications from an operating location in a second memory area to a first memory area, generating a backup upgrade file by copying the contents of the upgrade file from the second memory area to the first memory area, and generating a new upgrade client by upgrading the upgrade client software applications using information of the backup upgrade client and the backup upgrade file. The method of an embodiment further comprises storing the new upgrade client in the first memory area. The automatic upgrading of the upgrade client software applications of an embodiment further comprises generating a backup new upgrade client by copying the new upgrade client to the second memory area. The automatic upgrading of software applications of the upgrade client of an embodiment further comprises at least one of deleting the upgrade client from the operating location, and copying the backup new upgrade client to the operating location.

The method of an embodiment further comprises automatically recovering the portable device to at least one operational state in response to a failure during the automatic upgrading of at least one of the portable device software applications and the upgrade client software applications.

The upgrade file contents of an embodiment include at least one of difference files and embedded software components.

The self-upgrading upgrade client of an embodiment includes a system for upgrading electronic files, comprising a first device including a first upgrade component that generates upgrade files, wherein the upgrade files include at least one of information to repair errors in electronic files and information to add functionality to the electronic files, and a mobile communication device comprising a second upgrade component that includes an upgrade sub-client and a self-upgrade sub-client, the second upgrade component receiving the upgrade files via a wireless coupling with the first device, the upgrade sub-client automatically upgrading electronic applications of the device using contents of the upgrade files, and the self-upgrade sub-client automatically upgrading electronic applications of the upgrade client using contents of the upgrade files.

The first device of an embodiment is a processor-based device accessible by at least one provider of software components hosted on the second device.

The mobile communication device of an embodiment includes at least one of cellular telephones, portable computing devices, and personal digital assistants.

The electronic files of an embodiment comprise software files including dynamic link library files, shared object files, embedded software components (EBSCs), firmware files, executable files, data files including hex data files, system configuration files, and files including personal use data.

The self-upgrading upgrade client of an embodiment includes a method comprising at least one of receiving an upgrade file at an upgrade client of a portable device, wherein contents of the upgrade file include at least one of information to repair errors in software applications and information to upgrade functions provided by the software applications, verifying the contents using at least one error checking and correction process, selecting an operating mode of the upgrade client in response to the contents, automatically upgrading software applications of the portable device when the contents are targeted for the portable device software applications, automatically upgrading software applications of the upgrade client when the contents are targeted for the upgrade client software applications, and automatically recovering the portable device to at least one operational state in response to a failure during the automatic upgrading of at least one of the portable device software applications and the upgrade client software applications.

The self-upgrading upgrade client of an embodiment includes a mobile communication device comprising at least one of means for receiving an upgrade file at an upgrade client of the device, wherein contents of the upgrade file include at least one of information to repair errors in software applications and information to upgrade functions provided by the software applications, means for automatically upgrading software applications of the device when the contents are targeted for the device software applications, and means for automatically upgrading software applications of the upgrade client when the contents are targeted for the upgrade client software applications.

The mobile communication device of an embodiment further comprises means for selecting an operating mode of the upgrade client in response to at least one of availability of the upgrade file and the contents of the upgrade file, wherein the operating modes include at least one of a real-time operating system (RTOS) mode, an initial program load (IPL) mode, and a boot mode.

The means for receiving of an embodiment further comprises at least one of means for storing the upgrade file in a first memory area of the portable device and means for generating a backup version of the upgrade file in a second memory area.

The means for automatically upgrading the upgrade client software applications of an embodiment further comprises at least one of means for generating a backup upgrade client by copying the upgrade client software applications from an operating location in a second memory area to a first memory area, means for generating a backup upgrade file by copying the contents of the upgrade file from the second memory area to the first memory area, and means for generating a new upgrade client by upgrading the upgrade client software applications using information of the backup upgrade client and the backup upgrade file.

The means for automatically upgrading the upgrade client software applications of an embodiment further comprises means for generating a backup new upgrade client by copying the new upgrade client to the second memory area.

The means for automatically upgrading software applications of the upgrade client of an embodiment further comprises at least one of means for deleting the upgrade client from the operating location and means for copying the backup new upgrade client to the operating location.

The mobile communication device of an embodiment further comprises means for automatically recovering the portable device to at least one operational state in response to a failure during the automatic upgrading of at least one of the portable device software applications and the upgrade client software applications.

The self-upgrading upgrade client of an embodiment includes a machine-readable medium including executable instructions which, when executed in a processing system, upgrade software in a portable device by at least one of receiving an upgrade file at an upgrade client of a portable device, wherein contents of the upgrade file include at least one of information to repair errors in software applications and information to upgrade functions provided by the software applications, automatically upgrading software applications of the portable device when the contents are targeted for the portable device software applications, and automatically upgrading software applications of the upgrade client when the contents are targeted for the upgrade client software applications.

Aspects of the upgrade client described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the upgrade client include: microcontrollers with memory (such as EEPROM), embedded microprocessors, firmware, software, etc. Furthermore, aspects of the upgrade client may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital; etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the upgrade client is not intended to be exhaustive or to limit the upgrade client to the precise form disclosed. While specific embodiments of, and examples for, the upgrade client are described herein for illustrative purposes, various equivalent modifications are possible within the scope of the upgrade client, as those skilled in the relevant art will recognize. The teachings of the upgrade client provided herein can be applied to other processing systems and methods, not only for the memory systems and methods described above.

The elements and acts of the various embodiments described above can be combined to provide further embodiments. These and other changes can be made to the upgrade client in light of the above detailed description.

In general, in the following claims, the terms used should not be construed to limit the upgrade client to the specific embodiments disclosed in the specification and the claims, but should be construed to include all processing systems that operate under the claims. Accordingly, the upgrade client is not limited by the disclosure, but instead the scope of the upgrade client is to be determined entirely by the claims.

While certain aspects of the upgrade client are presented below in certain claim forms, the inventor contemplates the various aspects of the upgrade client in any number of claim forms. For example, while only one aspect of the upgrade client is recited as embodied in computer-readable medium, other aspects may likewise be embodied in computer-readable medium. Accordingly, the inventor reserves the right to add additional claims after filing the application to pursue such additional claim forms for other aspects of the upgrade client.

What is claimed is:

1. A portable communication device comprising an upgrade client coupled to a processor, the upgrade client including an upgrade sub-client and a self-upgrade sub-client, wherein the upgrade client receives upgrade files over a wireless coupling, wherein the upgrade sub-client automatically upgrades electronic applications of the device using contents of the upgrade files, wherein the self-upgrade sub-client automatically upgrades electronic applications of the upgrade client using contents of the upgrade files.

2. The device of claim 1, wherein the electronic applications of the upgrade client include electronic applications of the upgrade sub-client and the self-upgrade sub-client.

3. The device of claim 1, wherein the upgrade client further comprises a download sub-client that controls receipt of the upgrade files, wherein the electronic applications of the upgrade client include electronic applications of the download sub-client.

4. The device of claim 1, wherein the upgrades include at least one of repairing errors in the electronic files and providing additional electronic files.

5. The device of claim 1, wherein the processor automatically recovers the portable communication device to at least one operational state in response to a failure during the automatic upgrades.

6. The device of claim 1, wherein the portable communication device is at least one of a cellular telephone, a portable computing device, and a personal digital assistant.

7. The device of claim 1, wherein the upgrade client includes one or more operating modes that include at least one of a real-time operating system (RTOS) mode, an initial program load (IPL) mode, and a boot mode.

8. The device of claim 7, wherein the upgrade sub-client automatically upgrades electronic applications of the device during the IPL mode.

9. The device of claim 7, wherein the self-upgrade sub-client automatically upgrades electronic applications of the upgrade client during the boot mode.

10. The device of claim 7, wherein a download sub-client automatically controls at least one of downloading and storing of the upgrade files during the RTOS mode.

11. The device of claim 1, wherein the upgrade sub-client is in a first memory area of the device and the self-upgrade sub-client is in a second memory area of the device.

12. A method comprising:
receiving an upgrade file at an upgrade client of a portable device, wherein contents of the upgrade file include at least one of information to repair errors in software applications and information to upgrade functions provided by the software applications;
automatically upgrading software applications of the portable device when the contents are targeted for the portable device software applications; and
automatically upgrading software applications of the upgrade client when the contents are targeted for the upgrade client software applications.

13. The method of claim 12, further comprising selecting an operating mode of the upgrade client in response to at least one of availability of the upgrade file and the contents of the upgrade file.

14. The method of claim 13, wherein the operating modes include at least one of a real-time operating system (RTOS) mode, an initial program load (IPL) mode, and a boot mode.

15. The method of claim 14, wherein the RTOS mode includes downloading of the upgrade file by a download sub-client of the upgrade client.

16. The method of claim 14, wherein the IPL mode includes automatically upgrading the portable device software applications.

17. The method of claim 14, wherein the boot mode includes automatically upgrading the upgrade client software applications.

18. The method of claim 12, wherein receiving further comprises:
storing the upgrade file in a first memory area of the portable device; and
generating a backup version of the upgrade file in a second memory area.

19. The method of claim 18, wherein the first memory area is one or more regions of a random access memory, and the second memory area is one or more regions of a read-only memory.

20. The method of claim 12, wherein receiving further comprises verifying the contents of the upgrade file by applying at least one error checking and correction process to the contents, the at least one error checking and correction process including use of at least one of cyclic redundancy codes (CRC) and checksum values.

21. The method of claim 12, wherein automatically upgrading the upgrade client software applications further comprises:
generating a backup upgrade client by copying the upgrade client software applications from an operating location in a second memory area to a first memory area;
generating a backup upgrade file by copying the contents of the upgrade file from the second memory area to the first memory area; and
generating a new upgrade client by upgrading the upgrade client software applications using information of the backup upgrade client and the backup upgrade file.

22. The method of claim 21, further comprising storing the new upgrade client in the first memory area.

23. The method of claim 21, wherein automatically upgrading the upgrade client software applications further comprises generating a backup new upgrade client by copying the new upgrade client to the second memory area.

24. The method of claim 21, wherein automatically upgrading software applications of the upgrade client further comprises:
deleting the upgrade client from the operating location; and
copying the backup new upgrade client to the operating location.

25. The method of claim 12, further comprising automatically recovering the portable device to at least one operational state in response to a failure during the automatic upgrading of at least one of the portable device software applications and the upgrade client software applications.

26. The method of claim 12, wherein the upgrade file contents include at least one of difference files and embedded software components.

27. A system for upgrading electronic files, comprising:
a first device including a first upgrade component that generates upgrade files, wherein the upgrade files include at least one of information to repair errors in electronic files and information to add functionality to the electronic files; and
a mobile cotumunication device comprising a second upgrade component that includes an upgrade sub-client and a self-upgrade sub-client, the second upgrade component receiving the upgrade files via a wireless coupling with the first device, the upgrade sub-client automatically upgrading electronic applications of the device using contents of the upgrade files, and the self-upgrade sub-client automatically upgrading electronic applications of the upgrade client using contents of the upgrade files.

28. The system of claim 27, wherein the first device is a processor-based device accessible by at least one provider of software components hosted on the second device.

29. The system of claim 27, wherein the mobile communication device includes at least one of cellular telephones, portable computing devices, and personal digital assistants.

30. The system of claim 27, wherein the electronic files comprise software files including dynamic link library files, shared object files, embedded software components (EBSCs), firmware files, executable files, data files including hex data files, system configuration files, and files including personal use data.

31. A method comprising:
receiving an upgrade file at an upgrade client of a portable device, wherein contents of the upgrade file include at least one of information to repair errors in software applications and information to upgrade functions provided by the software applications;
verifying the contents using at least one error checking and correction process;
selecting an operating mode of the upgrade client in response to the contents;
automatically upgrading software applications of the portable device when the contents are targeted for the portable device software applications;
automatically upgrading software applications of the upgrade client when the contents are targeted for the upgrade client software applications; and
automatically recovering the portable device to at least one operational state in response to a failure during the automatic upgrading of at least one of the portable device software applications and the upgrade client software applications.

32. A mobile communication device comprising:
a processor;
means coupled to the processor for receiving an upgrade file at an upgrade client of the device, wherein contents of the upgrade file include at least one of information to repair errors in software applications and information to upgrade functions provided by the software applications;
means coupled to the processor for automatically upgrading software applications of the device when the contents are targeted for the device software applications; and
means coupled to the processor for automatically upgrading software applications of the upgrade client when the contents are targeted for the upgrade client software applications.

33. The device of claim 32, further comprising means coupled to the processor for selecting an operating mode of the upgrade client in response to at least one of availability of the upgrade file and the contents of the upgrade file, wherein the operating modes include at least one of a real-time operating system (RTOS) mode, an initial program load (IPL) mode, and a boot mode.

34. The device of claim 32, wherein the means for receiving further comprises at least one of means for storing the upgrade file in a first memory area of the portable device and means for generating a backup version of the upgrade file in a second memory area.

35. The device of claim 32, wherein the means for automatically upgrading the upgrade client software applications further comprises at least one of:
means for generating a backup upgrade client by copying the upgrade client software applications from an operating location in a second memory area to a first memory area;
means for generating a backup upgrade file by copying the contents of the upgrade file from the second memory area to the first memory area; and
means for generating a new upgrade client by upgrading the upgrade client software applications using information of the backup upgrade client and the backup upgrade file.

36. The device of claim 35, wherein the means for automatically upgrading the upgrade client software applications frirther comprises means for generating a backup new upgrade client by copying the new upgrade client to the second memory area.

37. The device of claim 35, wherein the means for automatically upgrading software applications of the upgrade client further comprises at least one of means for deleting the upgrade client from the operating location and means for copying the backup new upgrade client to the operating location.

38. The device of claim 32, further comprising means coupled to the processor for automatically recovering the portable device to at least one operational state in response to a failure during the automatic upgrading of at least one of the portable device software applications and the upgrade client software applications.

* * * * *